United States Patent
Joshi et al.

(10) Patent No.: US 11,372,701 B2
(45) Date of Patent: *Jun. 28, 2022

(54) STATISTICAL DESIGN WITH IMPORTANCE SAMPLING REUSE

(71) Applicant: International Business Machines Corporation, Armonk, NY (US)

(72) Inventors: Rajiv V. Joshi, Yorktown Heights, NY (US); Rouwaida N. Kanj, Round Rock, TX (US); Sani R. Nassif, Austin, TX (US); Carl J. Radens, LaGrangeville, NY (US)

(73) Assignee: International Business Machines Corporation, Armonk, NY (US)

(*) Notice: Subject to any disclaimer, the term of this patent is extended or adjusted under 35 U.S.C. 154(b) by 134 days.

This patent is subject to a terminal disclaimer.

(21) Appl. No.: 16/543,776

(22) Filed: Aug. 19, 2019

(65) Prior Publication Data

US 2019/0370100 A1 Dec. 5, 2019

Related U.S. Application Data

(63) Continuation of application No. 15/161,462, filed on May 23, 2016, now Pat. No. 10,387,235, which is a
(Continued)

(51) Int. Cl.
*G06F 30/33* (2020.01)
*G06F 30/20* (2020.01)
(Continued)

(52) U.S. Cl.
CPC .......... *G06F 11/076* (2013.01); *G06F 11/008* (2013.01); *G06F 11/079* (2013.01);
(Continued)

(58) Field of Classification Search
None
See application file for complete search history.

(56) References Cited

U.S. PATENT DOCUMENTS 5,235,506 A * 8/1993 O'Brien, Jr. .......... G06T 11/206
703/2
5,943,661 A * 8/1999 Katz ..................... G06N 3/105
706/16
(Continued)

FOREIGN PATENT DOCUMENTS

WO WO2009/076600 A2 6/2009

OTHER PUBLICATIONS

Wikipedia Definition—Continuous Uniform Distribution—https://en.wikipedia.org/wiki/Continuous_uniform_distribution, pp. 1-11 (Year: 2021).*
(Continued)

*Primary Examiner* — Akash Saxena
(74) *Attorney, Agent, or Firm* — Stephen R. Tkacs; Stephen J. Walder, Jr.; Brian Welle

(57) ABSTRACT

A mechanism is provided for reusing importance sampling for efficient cell failure rate estimation of process variations and other design considerations. First, the mechanism performs a search across circuit parameters to determine failures with respect to a set of performance variables. For a single failure region, the initial search may be a uniform sampling of the parameter space. Mixture importance sampling (MIS) efficiently may estimate the single failure region. The mechanism then finds a center of gravity for each metric and finds importance samples. Then, for each new origin corresponding to a process variation or other design consideration, the mechanism finds a suitable projection and recomputes new importance sampling (IS) ratios.

20 Claims, 12 Drawing Sheets

Related U.S. Application Data continuation of application No. 14/242,418, filed on Apr. 1, 2014, now Pat. No. 9,348,680, which is a continuation of application No. 12/859,871, filed on Aug. 20, 2010, now abandoned.

(51) Int. Cl.
*G06F 111/08* (2020.01)
*G06F 11/07* (2006.01)
*G06F 11/00* (2006.01)

(52) U.S. Cl.
CPC .............. *G06F 30/33* (2020.01); *G06F 30/20* (2020.01); *G06F 2111/08* (2020.01)

(56) References Cited

U.S. PATENT DOCUMENTS

| | | | |
|---|---|---|---|
| 7,006,947 B2 | 2/2006 | Tryon, III et al. | |
| 7,016,825 B1* | 3/2006 | Tryon, III | G06F 30/23 702/182 |
| 7,096,140 B2* | 8/2006 | Nozuyama | G01R 31/3008 702/117 |
| 7,272,808 B1* | 9/2007 | Sharma | G06F 30/367 716/112 |
| 7,380,225 B2* | 5/2008 | Joshi | G11C 29/54 703/2 |
| 7,480,601 B2 | 1/2009 | Tryon, III | |
| 7,508,697 B1* | 3/2009 | Mukhopadhyay | G11C 29/028 365/189.09 |
| 7,827,018 B2* | 11/2010 | Adams | G11C 29/82 714/10 |
| 7,920,995 B2* | 4/2011 | Gilg | G06F 30/00 703/2 |
| 7,979,832 B2 | 7/2011 | Jung et al. | |
| 8,010,325 B2* | 8/2011 | De Barros | G06F 11/3457 703/22 |
| 8,155,938 B2* | 4/2012 | Singhee | G06F 30/367 703/6 |
| 8,214,190 B2 | 7/2012 | Joshi et al. | |
| 8,219,355 B2 | 7/2012 | Tiwary et al. | |
| 8,275,596 B2* | 9/2012 | Wason | G06F 30/367 716/100 |
| 8,285,522 B1* | 10/2012 | Tryon, III | G06F 30/23 703/2 |
| 8,290,753 B2 | 10/2012 | Tyron, III et al. | |
| 8,346,528 B2 | 1/2013 | Joshi et al. | |
| 8,374,839 B2* | 2/2013 | Satoh | G06F 30/367 703/2 |
| 8,515,724 B2 | 8/2013 | Joshi et al. | |
| 8,806,418 B1* | 8/2014 | Jallepalli | G06F 30/33 716/136 |
| 10,139,446 B2* | 11/2018 | Joshi | G06F 30/00 |
| 10,387,596 B2* | 8/2019 | Joshi | G06F 30/367 |
| 10,762,166 B1* | 9/2020 | Winston | G06N 5/04 |
| 10,853,550 B1* | 12/2020 | Zhang | G06F 30/367 |
| 2002/0035462 A1* | 3/2002 | Kidera | G06F 30/20 703/14 |
| 2003/0004679 A1* | 1/2003 | Tryon | H04L 41/5032 702/182 |
| 2003/0046026 A1* | 3/2003 | Levy | G06F 11/008 714/E11.02 |
| 2003/0061152 A1* | 3/2003 | De | G06Q 40/06 705/38 |
| 2003/0212713 A1* | 11/2003 | Campos | G06K 9/6223 |
| 2003/0228032 A1 | 12/2003 | Rui et al. | |
| 2004/0122642 A1* | 6/2004 | Scheffer | G06F 30/33 703/14 |
| 2004/0199444 A1* | 10/2004 | Woodcock | G06Q 40/02 705/35 |
| 2005/0273308 A1* | 12/2005 | Houston | G06F 30/3323 703/14 |
| 2006/0009951 A1 | 1/2006 | Tryon, III | |
| 2006/0142988 A1* | 6/2006 | Akiyama | G06F 30/20 703/14 |
| 2006/0150129 A1* | 7/2006 | Chiu | G06F 30/33 716/106 |
| 2006/0193400 A1 | 8/2006 | Morris et al. | |
| 2006/0229856 A1* | 10/2006 | Burrus | G16H 30/40 703/11 |
| 2007/0097763 A1* | 5/2007 | Tokorozuki | H01L 22/20 365/201 |
| 2007/0166847 A1* | 7/2007 | Fulkerson | G01R 31/31816 438/17 |
| 2007/0220455 A1* | 9/2007 | Joshi | G06F 30/367 716/56 |
| 2008/0015827 A1* | 1/2008 | Tryon | G06F 11/008 703/2 |
| 2008/0059143 A1* | 3/2008 | Chiu | G06F 30/20 703/14 |
| 2008/0071511 A1* | 3/2008 | Lin | G06F 30/367 703/14 |
| 2008/0140363 A1* | 6/2008 | Lin | G01R 31/318357 703/2 |
| 2008/0141190 A1* | 6/2008 | Jung | G06F 30/367 716/136 |
| 2008/0195325 A1 | 8/2008 | Joshi et al. | |
| 2008/0201117 A1* | 8/2008 | Wong | G06F 30/20 703/2 |
| 2009/0070716 A1* | 3/2009 | Joshi | G06F 30/398 716/132 |
| 2009/0112534 A1* | 4/2009 | Gilg | G05B 13/024 703/2 |
| 2009/0182536 A1* | 7/2009 | Morris | H04L 1/203 703/2 |
| 2009/0216359 A1* | 8/2009 | Mcconaghy | G06F 30/367 700/103 |
| 2009/0248368 A1* | 10/2009 | Goel | G06F 30/15 703/1 |
| 2009/0248387 A1* | 10/2009 | Singhee | G06F 30/367 703/16 |
| 2009/0307638 A1* | 12/2009 | Mcconaghy | G06F 30/36 716/104 |
| 2010/0010744 A1* | 1/2010 | Prange | G01R 33/483 324/303 |
| 2010/0107015 A1* | 4/2010 | Bernabeu-Auban | G06F 11/008 714/38.14 |
| 2010/0153086 A1* | 6/2010 | Satoh | G06F 30/367 703/14 |
| 2010/0250187 A1* | 9/2010 | Zuber | G06F 30/367 702/179 |
| 2010/0262414 A1* | 10/2010 | Joshi | G06F 30/3323 703/14 |
| 2010/0313070 A1* | 12/2010 | Joshi | G06F 11/008 714/E11.159 |
| 2011/0054856 A1* | 3/2011 | Joshi | G06F 30/367 703/2 |
| 2011/0153271 A1* | 6/2011 | Tiwary | G06K 9/6226 702/181 |
| 2011/0153272 A1* | 6/2011 | Tiwary | G01R 31/2894 702/181 |
| 2011/0307438 A1* | 12/2011 | Fernández Martínez | G01V 99/005 706/52 |
| 2011/0313747 A1* | 12/2011 | Joshi | G06F 30/23 703/14 |
| 2012/0046929 A1* | 2/2012 | Joshi | G06F 11/076 703/13 |
| 2012/0150500 A1* | 6/2012 | Ikeda | G06F 17/11 703/2 |
| 2012/0317656 A1* | 12/2012 | Woodruff | H04L 9/008 726/28 |
| 2013/0159947 A1* | 6/2013 | Gattiker | G06F 30/398 716/107 |
| 2013/0205170 A1* | 8/2013 | Bluvband | G05B 23/0248 714/E11.029 |

(56) References Cited

U.S. PATENT DOCUMENTS

| | | | |
|---|---|---|---|
| 2013/0226544 A1* | 8/2013 | Mcconaghy | G06F 30/398 703/2 |
| 2014/0244563 A1* | 8/2014 | Atomori | G06N 5/02 706/46 |
| 2014/0350900 A1* | 11/2014 | Lee | G06F 30/20 703/2 |

OTHER PUBLICATIONS

"List of IBM Patents or Patent Applications Treated as Related", Aug. 19, 2019, 2 Pages.

Date, Takanori et al., "Robust Importance Sampling for Efficient SRAM Yield Analysis", IEEE paper, 2010, 11th Int'l Symposium on Quality Electronic Design, pp. 15-21.

Doorn, T.S. et al., "Importance Sampling Monte Carlo simulations for accurate estimation of SRAM yield", http://www.win.tue.nl/analysis/reports/rana08-25.pdf, accessed Apr. 26, 2010, 4 pages.

Kanj, Rouwaida et al., "Mixture Importance Sampling and Its Application to the Analysis of SRAM Designs in the Presence of Rare Failure Events", ACM, DAC2006, Jul. 24-28, 2004, San Francisco, California, 2004, 4 pages.

Katayama, Kentaro et al., "Sequential Importance Sampling for Low-Probability and High-Dimensional SRAM Yield Analysis", IEEE, Nov. 7-11, 2010, pp. 703-708.

Pagano, Michele et al., "Efficient Rare Event Simulation: A Tutorial on Importance Sampling", HET-NETs '05, Jul. 2005, pp. 1-244.

Shahabuddin, Perwez, "Importance Sampling for the Simulation of Highly Reliable Markovian Systems", Management Science, vol. 40, No. 3, Mar. 1994, pp. 333-352.

\* cited by examiner

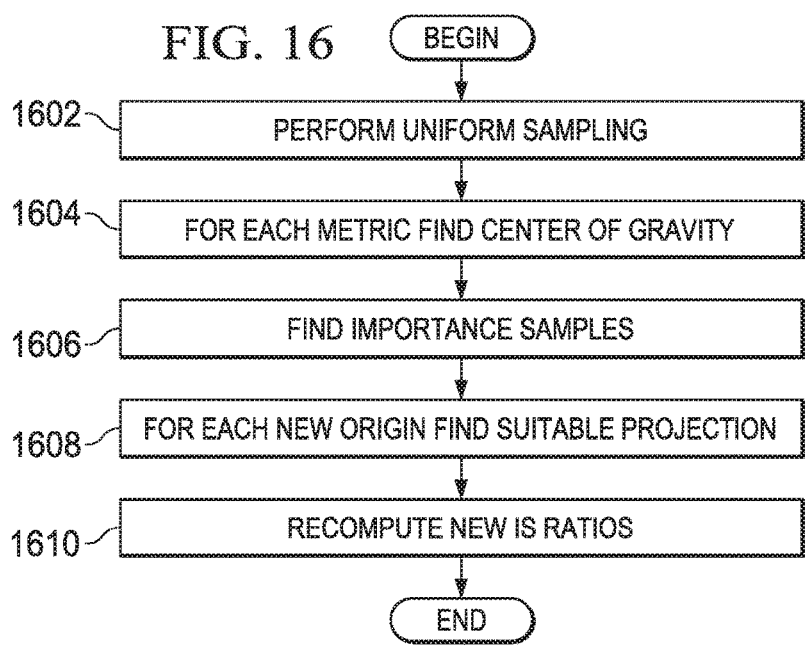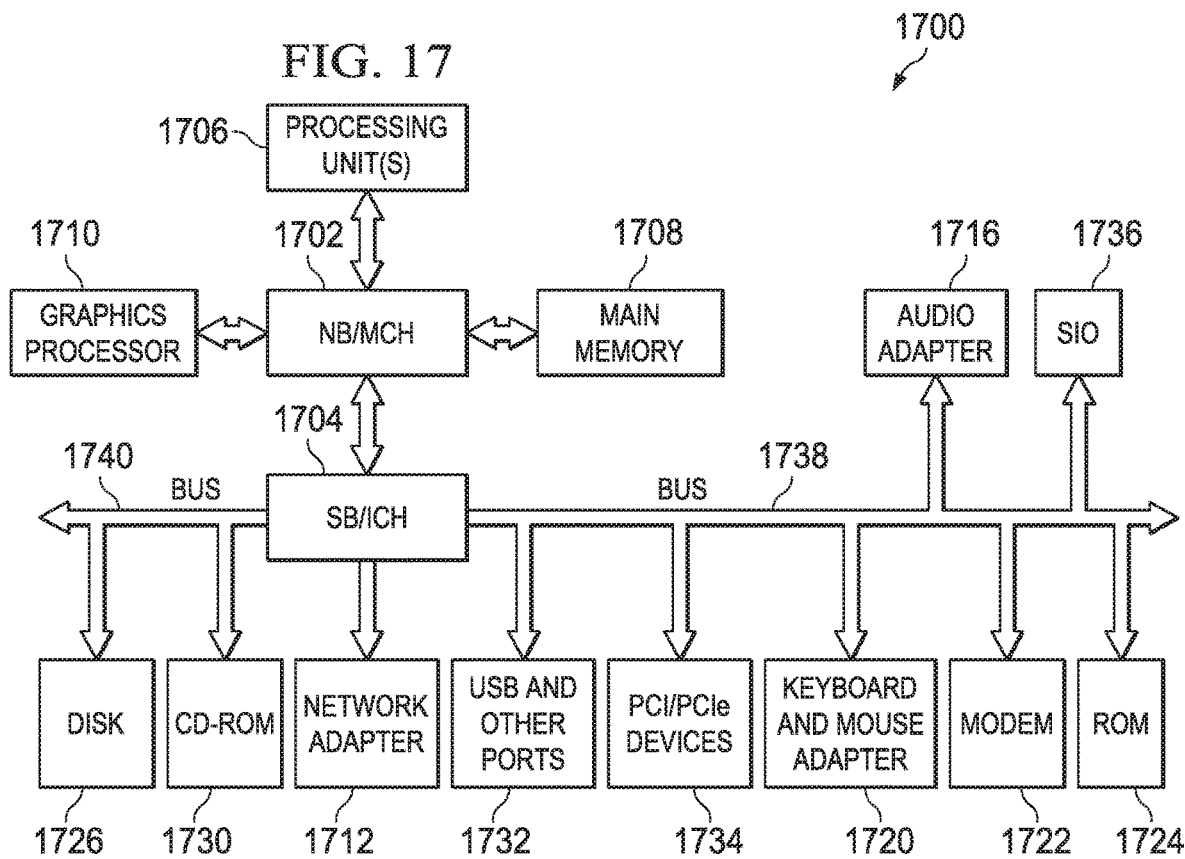

STATISTICAL DESIGN WITH IMPORTANCE SAMPLING REUSE

BACKGROUND

The present application relates generally to an improved data processing apparatus and method and more specifically to mechanisms for simulation based characterization of circuits using statistical design with importance sampling reuse.

As memory array architectures are pushed to their practical limits by increasing requirements for density and speed, accurately estimating the cell failure rate of a design becomes increasingly critical. Since a finite number of redundant rows and/or columns is available to replace those containing defective cells, a number of failed cells above this level of redundancy will yield a defective device. The number of defective devices, or device yield is then directly related to the cell failure rate. The larger arrays being fabricated today have increasingly stringent failure rate control requirements. For example, in order to achieve a yield of 90% in a one-million cell array without redundancy, a failure rate below five standard deviations ($5\sigma$) must be held.

Traditional techniques such as Monte-Carlo analysis produce accurate results at a cost of a large number of iterations, due to the random sampling of the entire probability space of the independent variables that are treated in the analysis. As the cell failure rate decreases, the number of samples and iterations required for accurate analysis becomes increasingly large, because of the relatively sparse distribution of samples in the distribution tail(s) that correspond to failed cells. The effect of circuit changes on cell readability and writability, as well as minimum read and write cycle times and margins, are difficult to estimate at very low failure rate levels. Such low failure rates cause further complications for adjusting designs to achieve the best result.

Techniques other than Monte-Carlo analysis have been implemented for estimating cell failure rates, each with related drawbacks. Sensitivity analysis is a well-known technique in which the gradients of the various independent variables are used to determine the bounds of the non-failure confidence region. However, accurate estimates of the failure rate are not typically produced by sensitivity analysis, as sensitivity analysis by its very nature cannot determine the exact overlapping impact of all independent variables on the cell failure rate at once. Another technique that can accurately estimate the failure rate is the grid analysis approach, in which the grid size can be made arbitrarily small. However, the number of simulations increases exponentially with the number of independent variables and typically a large amount of custom coded program control (scripting) must be employed to direct the analysis.

SUMMARY

In one illustrative embodiment, a method, in a data processing system, is provided for determining failure rate of a device using importance sampling reuse. The method comprises performing, by the data processing system, a uniform sampling over a random sample space for a metric for the device with respect to an origin to form a set of samples. The set of samples comprises one or more failing samples. The method further comprises determining, by the data processing system, a center of gravity of the one or more failing samples with respect to the origin and determining, by the data processing system, importance samples based on the center of gravity of the one or more failing samples. The method further comprises selecting a new origin, recomputing, by the data processing system, new importance sampling weight ratios for the new origin, and determining, by the data processing system, a failure rate for the device based on the new importance sampling weight ratios for the new origin.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 16 is a flowchart illustrating operation of a mechanism for statistical design with importance sampling reuse in accordance with an illustrative embodiment; and FIG. 17 is a block diagram of an example data processing system in which aspects of the illustrative embodiments may be implemented.

DETAILED DESCRIPTION

Figure 1:
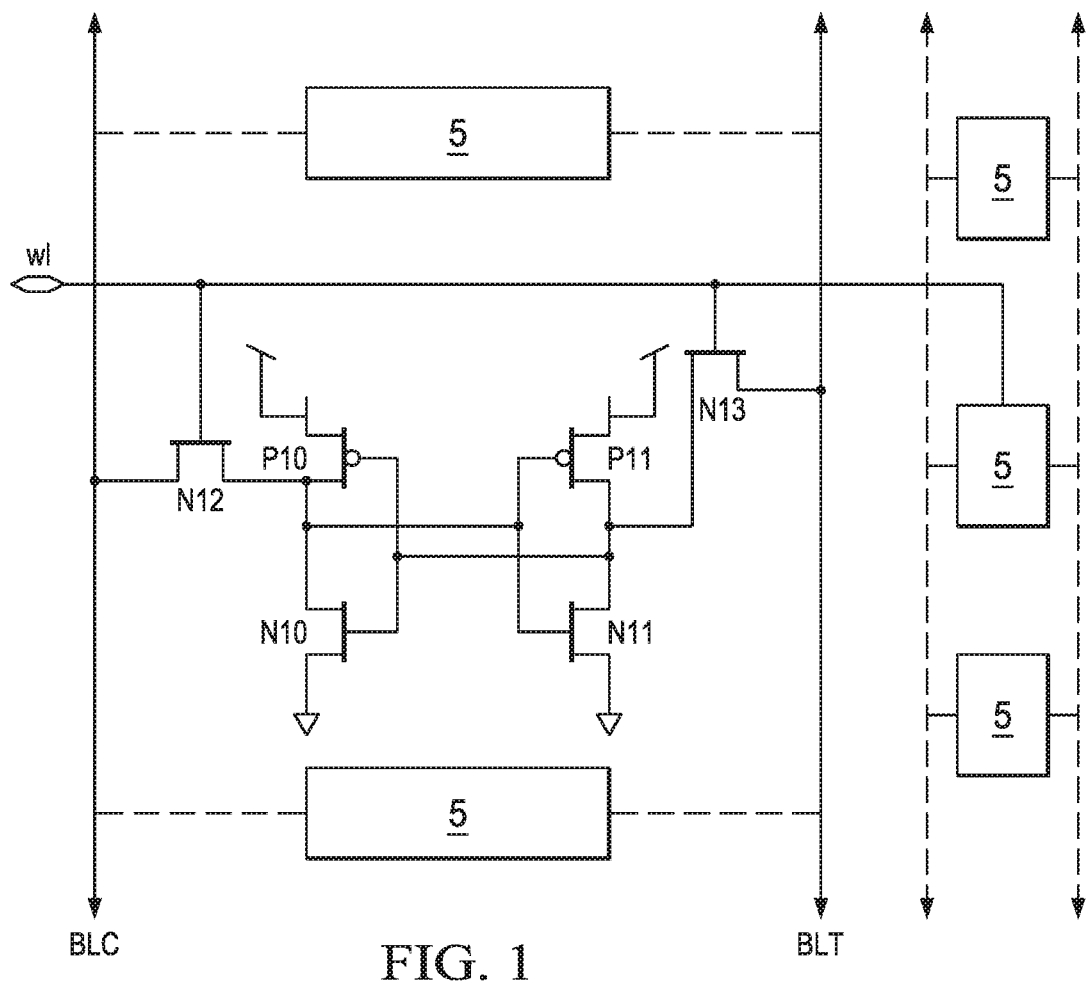
FIG. 1 is a schematic diagram of a memory cell within an array of memory cells that can be modeled in accordance with an illustrative embodiment.

The illustrative embodiments provide a mechanism for reusing importance sampling for efficient cell failure rate estimation of process variations and other design considerations. First, the mechanism performs a search across circuit parameters to determine failures with respect to a set of performance variables. For a single failure region, the initial search may be a uniform sampling of the parameter space. Mixture importance sampling (MIS) efficiently may estimate the single failure region. The mechanism then finds a center of gravity for each metric/region and finds importance samples. Then, for each new origin corresponding to a process variation or other design consideration, the mechanism finds a suitable projection and recomputes new importance sampling (IS) ratios.

Importance sampling is a general technique for estimating properties of a particular distribution, while only having samples generated from a different distribution rather than the distribution of interest. Depending on the application, the term may refer to the process of sampling from this alternative distribution, the process of inference, or both. The idea behind importance sampling is that certain values of the input random variables in a simulation have more impact on the metric being estimated than others. If these "important" values are emphasized by sampling more frequently, then the estimator variance can be reduced. Hence, the basic methodology in importance sampling is to choose a distribution which encourages the important values. This use of biased distributions will result in a biased estimator if it is applied directly in the simulation. However, the simulation outputs are weighted to correct for the use of the biased distribution, and this ensures that the new importance sampling estimator is unbiased.

The fundamental issue in implementing importance sampling simulation is the choice of the biased distribution which encourages the important regions of the input variables. Choosing or designing a good biased distribution is the art of importance sampling. The rewards for a good distribution can be huge run-time savings; the penalty for a bad distribution can be longer run times than for a general Monte-Carlo simulation without importance sampling.

More particularly, the mechanism of the illustrative embodiments may first perform uniform sampling until a predetermined number of failing samples are encountered. Then, the mechanism may perform importance sampling simulation to determine a biased (distorted) distribution for performing a second sampling. The mechanism may then weight the results to determine failure rate or yield information. Finally, in accordance with an illustrative embodiment, the mechanism may reuse the samples from the biased distribution with respect to a new origin to determine the yield for the new origin. In an alternative embodiment, the mechanism may reuse the samples from the uniform sampling to determine a new biased distribution for the new origin and then weight the results to determine the yield for the new origin.

Thus, the illustrative embodiments concern techniques for overcoming the limitations of traditional Monte-Carlo analysis for circuits where the failure rate of the circuit being analyzed is very low. For instance, with respect to circuits having large arrays of identical cells, the cells are generally the determining factor in the failure rate, but only as a totality of the cells. Because millions of cells may be incorporated in a memory array, even very low failure rates contribute significantly to the failure rate of the individual memory devices or other devices that incorporate memory such arrays.

It is necessary to analyze the cell design and process variations at the extreme end of the distribution of actual cell parameters in order to gain meaningful information that can accurately predict device yields and permit improvement of the cells in order to improve device yields. The techniques used in the prior art either require exhaustive computation and storage, or do not perform well once there are more than a small number of variable design and process parameters, such as device areas or lengths and widths, doping densities, threshold voltages and other measures of design and process parameters. The illustrative embodiments provide a mechanism for using mixture importance sampling (MIS), which is a known technique, in a manner that effectively models memory cells.

MIS uses a mixture of two or more distributions for generating sample values, with at least one of the distributions biased to generate samples in a region of interest. In the illustrative embodiments the sample values are input vectors of design- and process-dependent electrical circuit parameters that determine the performance of the memory cell. The performance is measured in terms of operational performance values such as read and write delay time, writability (i.e., can the cell value be changed during a write) and read stability (i.e., will the cell hold its value during reads), as well as the margins associated with the read and write times, under the operational and circuit parametric conditions simulated. Because a priori knowledge about what regions in N-space might be of interest is not generally easily obtained (where N is the number of variable parameters), the illustrative embodiments provide a front-end mechanism to the MIS analysis that identifies and quantifies a particular region or regions of interest for further study via the MIS technique. The result is that the computational overhead and storage associated with the analysis is greatly reduced, while yielding the desired accuracy with respect to the failure mechanism(s) being studied.

In order to locate a region of interest that provides information about a particular failure mechanism, a priori information about the failure mechanisms to expect is useful. If it is known that a single dominant failure mode is present, such as in many static random access memory (SRAM) cell designs, then the identification of the region of interest is simplified. If it is known that multiple regions of interest having statistically significant impact will be present, then the analysis can proceed until all regions of interest are identified. If it is not known how many failure mechanisms will be of interest and/or significant within the probability space to be explored, then techniques must be employed that can handle either the single-region or multiple region cases.

In the multiple region case, there are also two alternatives for applying the MIS technique. Either the regions of interest can be studied independently, or the sampling function for the MIS technique can include multiple sampling centers concentrated on the approximate centers of the multiple regions. The latter technique can be used to avoid error in failure rate prediction due to overlap of the regions of interest in one or more dimensions.

With reference now to the figures, and in particular with reference to FIG. 1, an example memory cell that can be modeled by a method in accordance with an illustrative embodiment is shown in an array that includes other cells 5. Transistors P10, N10, P11, and N11 form a cross-coupled static latch that provides the storage of a value in the cell. Transistors N12 and N13 provide for access to the value in response to a wordline select signal WL. Bitlines BLT (true bitline) and BLC (complement bitline) couple all cells in a column, so that when a row is selected by signal WL, only one row cell from each column is exposed to the memory logic. For a write operation, bitlines BLC and BLT are charged to voltages corresponding to the desired state of the memory cell and WL is activated (pulsed), setting the state of the latch formed by transistors P10, N10, P11 and N11. For a read operation, the bitlines BLC and BLT are previously charged to opposite state predetermined voltages (generally $V_{dd}$ and ground), and to commence the read, WL is pulsed and a sense amplifier coupled to bitlines BLC and BLT determines the stored state by differential comparison of bitlines BLC and BLT. Depending on the relative strengths of the transistors P10-11 and N10-13, the cell will exhibit varying ability to perform to predetermined read/write cycle times and may be unstable in that the cell value does not remain constant after a write or when being read. As operating frequencies are increased and device sizes correspondingly decreased, the variations take on a statistically significantly greater range causing failure of an increasing number of devices in a lot. The illustrative embodiments are directed toward an efficient method for statistically analyzing the design of memory cells so that the yield of memory cells can be predicted accurately and further so that yields may be improved by selecting optimized nominal values for the device parameters and other environmental parameters such as operating voltages.

While the illustrated cell is an example of a cell of order 4 that may be analyzed and improved by a method according to an embodiment of the invention, it should be understood that the techniques illustrated herein may be applied to memory cells of any order and design and to circuits other than memory circuits, as well. (Order as used herein refers to the number of devices that implement the storage element of the cell exclusive of the bitline access transistors.)

Figure 2A:
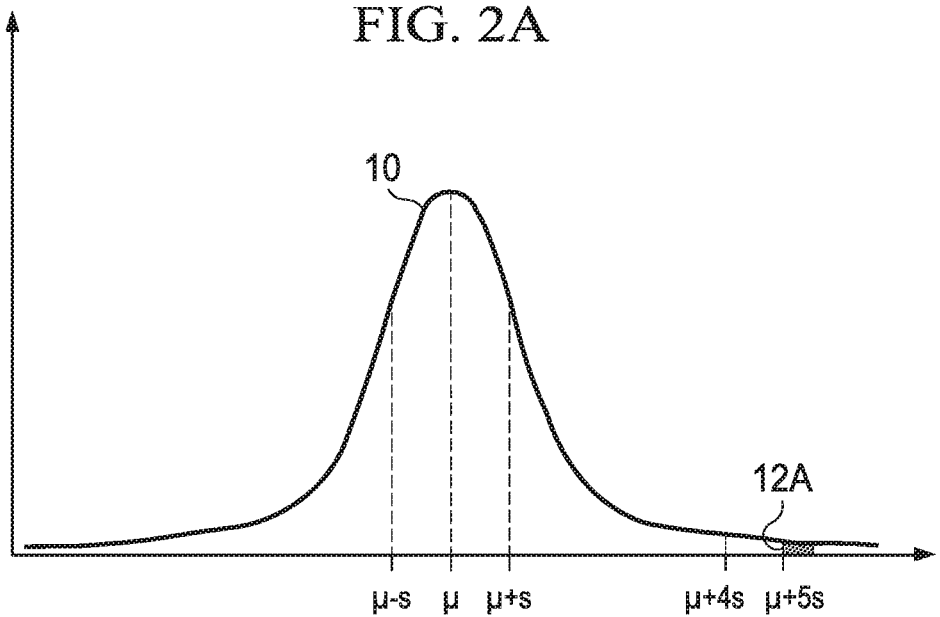
FIGS. 2A-2B and 3A-3B are graphs illustrating techniques employed in illustrative embodiments.

Referring now to FIG. 2A, a graph illustrating the purpose and techniques of the illustrative embodiments is shown. A distribution 10 of operational performance values, such as the above-mentioned delay times and writability/read stability measures, generally following a Gaussian shape extends past 5 standard deviations (5σ) on either side of a mean value. The input parameter values are generated by a similar Gaussian distribution of samples as generated around a nominal vector of cell parameter values by a Monte-Carlo algorithm.

Failure zone 12A in the graph is located past the 5σ point and is shown as a shaded area. The yield of the cell modeled by distribution 10 can be predicted from the graph, and thus the yield of the overall device. However, the accuracy near failure zone 12A is limited due to the relatively sparse distribution of samples in the tails of distribution 10. The illustrative embodiments use MIS to concentrate sampling within one or more failure zones, so that more accurate estimates of yield are produced.

Figure 2B:
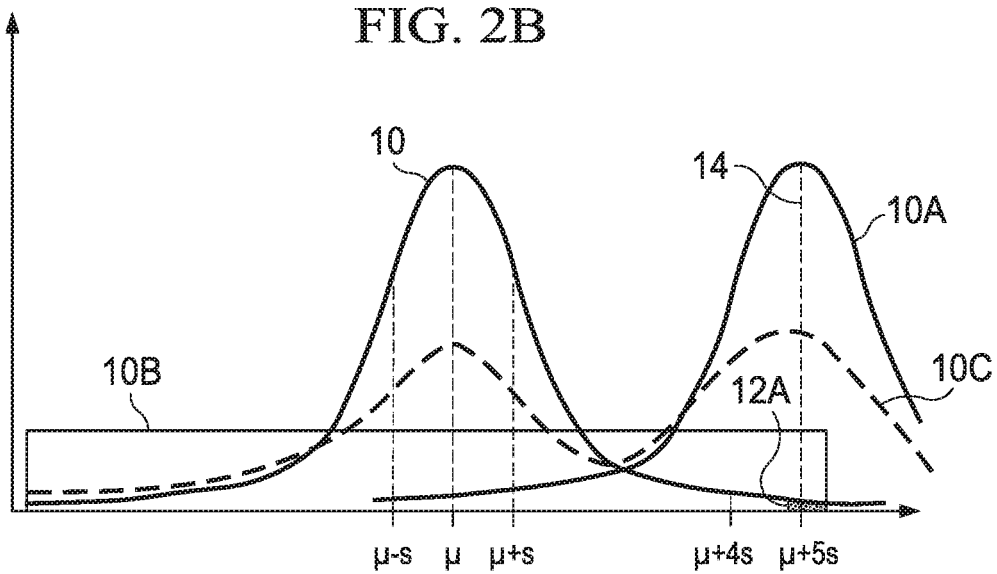

Referring now to FIG. 2B, a graph showing the operation of the illustrative embodiments is shown. Once a region of interest is identified in the device and process-dependent parameter space, a mixture 10C of distributions 10, 10A, and 10B is employed to improve the density of samples in zone 12A, while ensuring that gaps are not left in the distribution that might otherwise miss other failures. The mixture sampling function distribution 10C can be expressed by:

$$g_\lambda(x) = \lambda_1 p(x) + \lambda_2 U(x) + (1-\lambda_1-\lambda_2) p(x-\mu_s),$$

where $\lambda_1$ and $\lambda_2$ are coefficients used to control the mixture, which can be determined by the position of a new sampling function center $\mu_s$ 14 that is used to improve the concentration of samples around $\mu_s$. Note that $\mu_s$ is not the center of mixture sampling function distribution 10C, but rather the center of gaussian distribution 10A forming part of sampling function distribution 10C. Uniform distribution $U(x)$ 10B is also included in the mixture, which helps in ensuring that some samples are present for all values within the interval over which uniform distribution 10B extends. The choice of coefficients, in combination with the inclusion of the uniform distribution is made so that the number of samples in the region of interest is increased, but no "dead spots" are present in the analysis.

The result of the mixture sampling function is to generate a relatively larger number of samples over zone 12A (as compared to the distribution of FIG. 2A), yielding a much more precise estimate of the impact of zone 12A on. Results show a more than 10× improvement (or greater, in proportion to the distance of zone 12A from the nominal mean μ) in convergence time for estimates of the edges of failure zone 12A, which results in a corresponding improvement in convergence of the calculation of overall device yield.

While generally the statistical analysis detailed above will be conducted independently over the operational performance variables being studied, it is possible to conduct a combined pass/fail analysis over the parameter space in which no information about the particular operational performance variables associated with each failed point is retained, but the overall desirability of a particular design can be directly observed with respect to process variations. MIS analysis can then be conducted with one or more mean-shifting distributions included to precisely predict the yield.

Figure 3A:
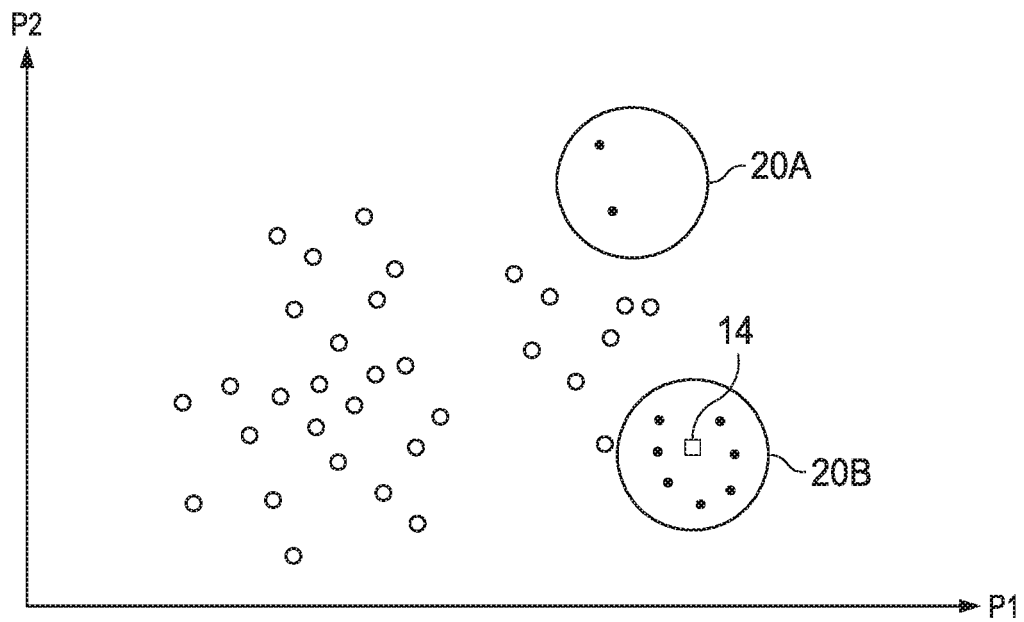

Referring now to FIG. 3A, a first technique for locating sampling function center $\mu_s$ 14, is depicted. Since memory cell operational performance variable failure regions generally will extend to the bounds of the analysis range (with respect to the parameter deviation) from the point at which the failures occur, failure regions can be ascribed to failure region boundaries beyond which the probability of failure only increases. The illustration is two-dimensional but in actual practice, a larger number of dimensions are actually being evaluated simultaneously. A number of sample points are generated by uniformly sampling the variable memory cell parameter space, corresponding to the dots shown in the depicted example. Quasi-random sampling techniques can be used to improve the spread of the samples across the parameter space. In the depicted example, hollow dots depict non-failing points and solid dots depict failing points. After a threshold number of failures is accumulated, which may be qualified by observing their proximity in the parameter space if multiple failure regions might be present (in order to group the failures), a particular failure region of interest 20B is identified and the vector centroid 14 of that region computed and used as new sampling function center $\mu_s$ 14 for subsequent MIS analysis. The vector centroid is computed from the vector distances of the points as the vector of average distance in each parameter space. There may be multiple failure regions for some applications of the techniques of the illustrative embodiments including other failure regions such as 20A, and those regions can be ignored if not of interest, or may be further evaluated with independent MIS analysis around their centers.

The above-described technique is especially applicable to the study of memory cell designs that have a single dominant failure region of interest. However, if it is not known in advance that there will be a single dominant region, the positions of the failure samples in parameter vector space can be observed and the samples grouped into one or more groups as mentioned above. If a group is much more distant from the nominal parameter vector, then that group may be discarded as being due to a relatively unimportant failure mechanism. The technique of the illustrative embodiments can be used to obtain better information about multiple failure mechanisms by the above grouping technique or discarding of groups.

A threshold number of samples can then be collected for each group to be studied and either an independent set of MIS analyses can be conducted for each group, or the above MIS sampling distribution function can be modified to follow:

$$g_\lambda(x) = \lambda_1 p(x) + \lambda_2 U(x) + \lambda_3 p(x - \mu_{s1}) + (1 - \lambda_1 - \lambda_2 - \lambda_3) p(x - \mu_{s2}),$$

where $\lambda_1$, $\lambda_2$ and $\lambda_3$ are coefficients used to control the mixture and new sampling function centers $\mu_{s1}$, $\mu_{s2}$ are used to improve the concentration of samples around two regions of interest. If more than two regions of interest are present, the above sampling function can be expanded to include other mean shifting values and their associated sampling function kernels in the above sampling function.

Figure 3B:
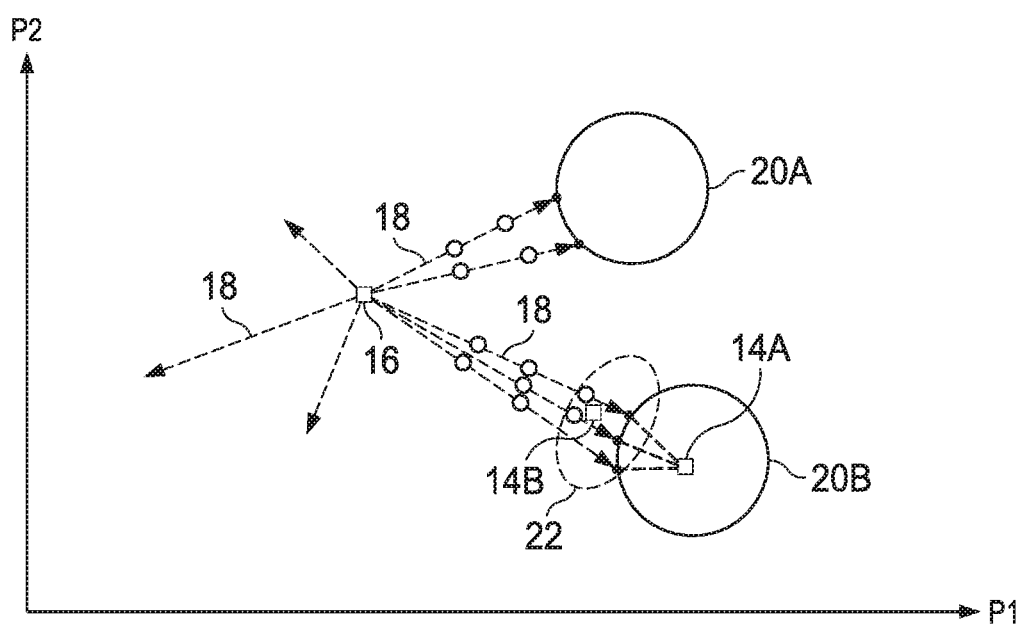

Referring now to FIG. 3B, another technique adapted for treating circuits having multiple dominant failure regions is depicted, e.g., circuits for which multiple failure mechanisms have fairly equivalent statistical significance. The technique may also be used for single failure region analysis, as well. A vector of nominal memory cell parameter values 16 is used as a starting point for random generation of a sufficient initial number of vector directions 18 along which cell failure analysis proceeds until failure points are detected. A sufficient number of vectors is generated so that failure regions will not be missed by the analysis. Gaussian latin hypercube sampling can be used to ensure uniform placement of the vectors in all directions.

The analysis then proceeds away from nominal vector 16 as illustrated. The generally monotonic behavior of the circuits as the parameters vary in one direction away from the nominal ensures that failing points will only be encountered at and beyond the boundaries of the failure regions 20A, 20B. The new sampling function center $\mu_s$ 14 for subsequent MIS analysis is determined either by the mean vector 14B corresponding to the group of boundary points 22, or an estimated vector 14A is extrapolated within failure region of interest 20B from the location of the boundary points. After a first iteration, if the boundaries of failure regions 20A, 20B are not sufficiently defined, a local set of random vectors is generated to enhance the set of samples around the boundaries. After boundaries 20A, 20B are sufficiently defined $\mu_s$ 14 is chosen as described above. As in the center of gravity technique, regions of interest that are more distant from the nominal vector can be discarded as relatively unimportant failure mechanisms. The technique illustrated in FIG. 3B also provides better information about multiple failure mechanisms by locating the boundaries of the regions of interest. If the boundaries are not well defined after the above analysis has been attempted, then the entire process can be repeated with a larger set of initial random vectors.

Figure 4:
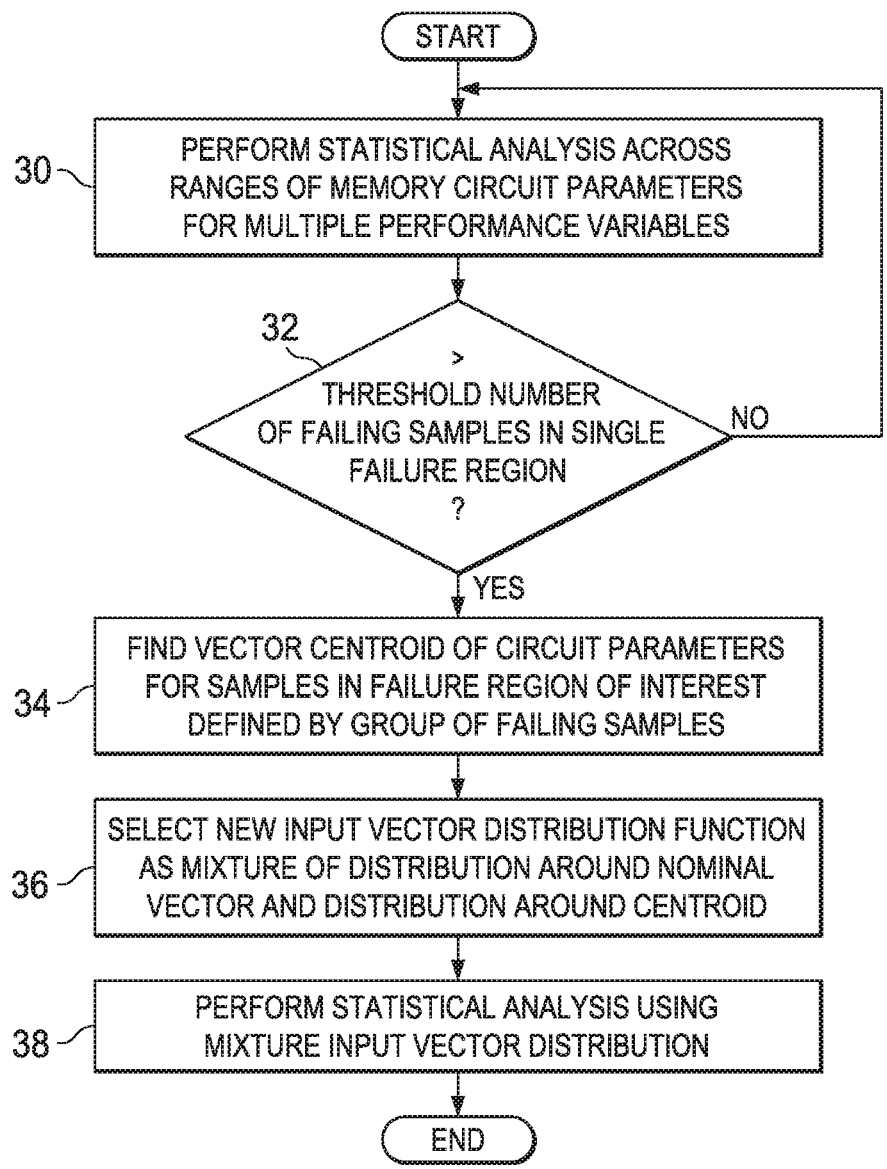
FIG. 4 is a flowchart illustrating operation of a centroid-locating technique in accordance with an illustrative embodiment.

FIG. 4 is a flowchart illustrating operation of a centroid-locating technique in accordance with an illustrative embodiment. The flowchart of FIG. 4 corresponds to the centroid-locating technique described above with reference to FIG. 3A. First, a statistical analysis across ranges of memory circuit parameters is performed for multiple performance variables (block 30) and once a threshold number of failing samples is accumulated (possibly qualified as being in a single failure region if required) (block 32) the centroid of the parameters corresponding to the group of failures is determined (block 34). Finally, a new distribution of input parameter vectors is selected in conformity with the determined centroid and the nominal vector (block 36) and an MIS analysis is performed (block 38) using the new mixture distribution to gain more accurate results in the region of the failures and a faster convergence of the overall yield computation, and operation ends.

Figure 5:
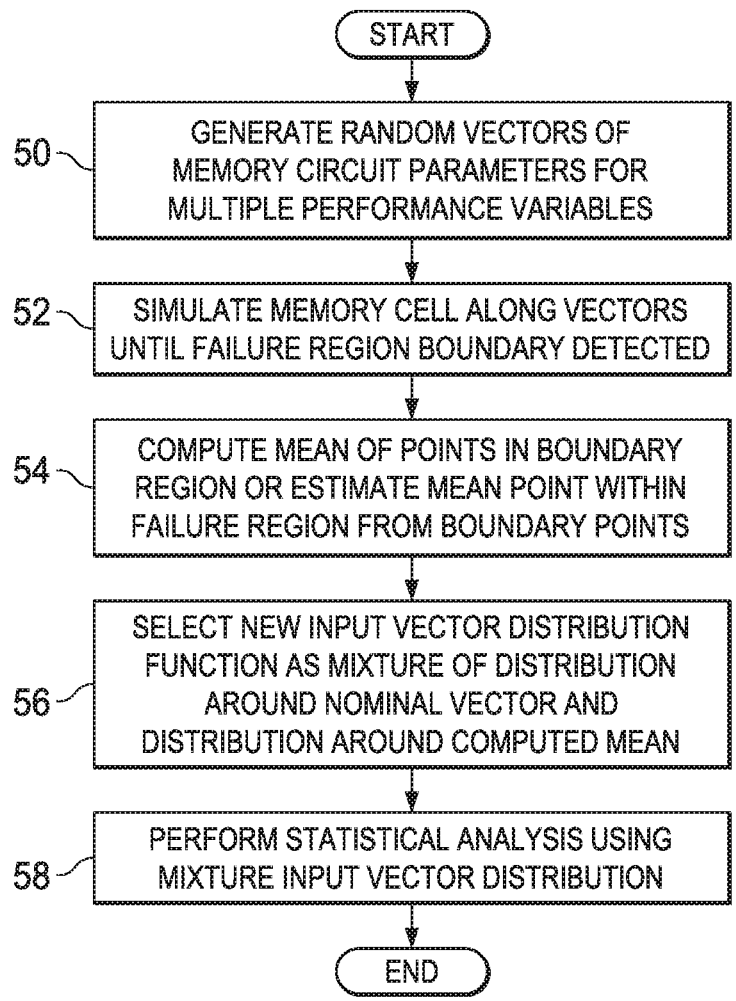
FIG. 5 is a flowchart illustrating operation of a random direction vector technique in accordance with an illustrative embodiment.

FIG. 5 is a flowchart illustrating operation of a random vector technique in accordance with an illustrative embodiment. The flowchart of FIG. 5 corresponds to the random vector technique described above with reference to FIG. 3B. First, random vector directions are generated around the nominal value of the memory circuit parameters (block 50). The memory cell is simulated along the vectors until a failure is detected, corresponding to a failure region boundary (block 52). Then, a mean point is computed from multiple failure region boundary points or a point is estimated within the failure region from the boundary points (block 54). An MIS distribution function is then selected (block 56) as a mixture of a distribution around the nominal parameter values and the mean point computed in block 54 (along with the uniform distribution), and an MIS analysis is performed (block 58) using the new mixture distribution to gain more accurate results in the region of the failures and a faster convergence of the overall yield computation, and operation ends.

Variability is a key problem in circuit design. Statistical analysis and simulations are needed to analyze design yield. For this, importance sampling was developed as a fast statistical analysis tool versus regular Monte-Carlo analysis. Often, circuit designers face situations where they revisit a circuit design with multiple design considerations. For example, design centering, optimization, and manufacturing variability require a lot of what-if statistical analysis studies.

For the design centering and manufacturing variability space, often global variation space is a subset of the random sample space. In accordance with an illustrative embodiment, a mechanism is provided to minimize function evaluations (simulations) and to reuse importance samples. For different global variation corners, the mechanism may infer yield information from samples obtained around the old origin.

Figure 6:
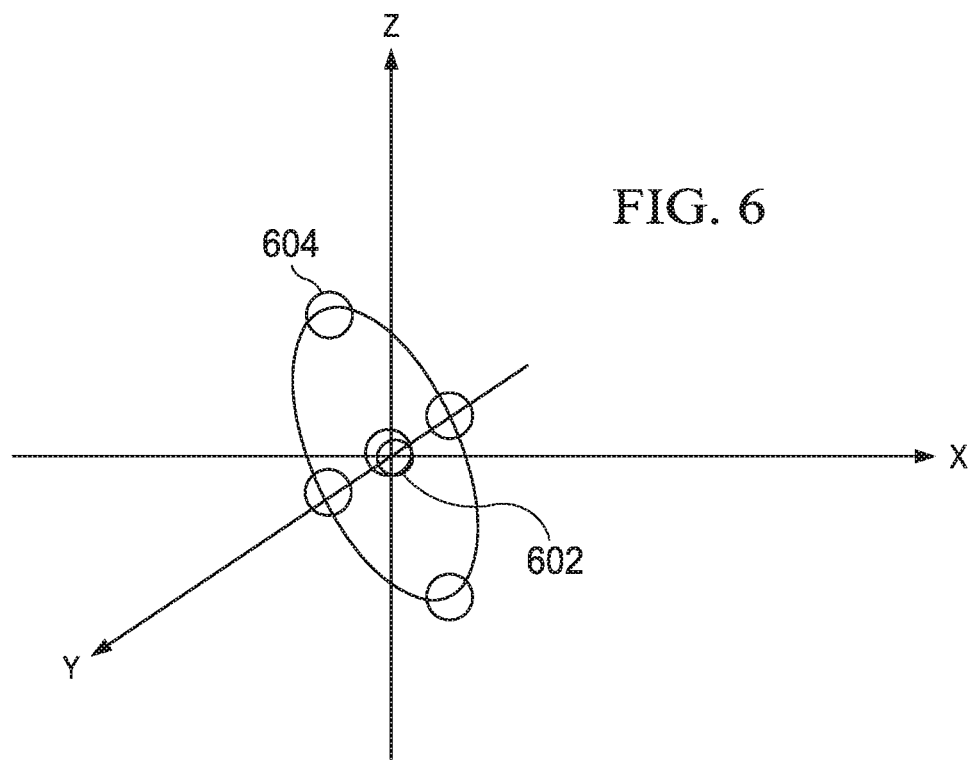
FIG. 6 is a graph depicting global variability space in accordance with an illustrative embodiment.

FIG. 6 is a graph depicting global variability space in accordance with an illustrative embodiment. The disk represents the global variability space defined by the following:

$$x = -z,$$

where x, y, and z are random variables. The mechanism of the illustrative embodiments may find importance samples for origin 602 and may recomputed new importance sample ratios for new origins 604, which are "corners" on the boundary of the global variability space.

Figure 7A:
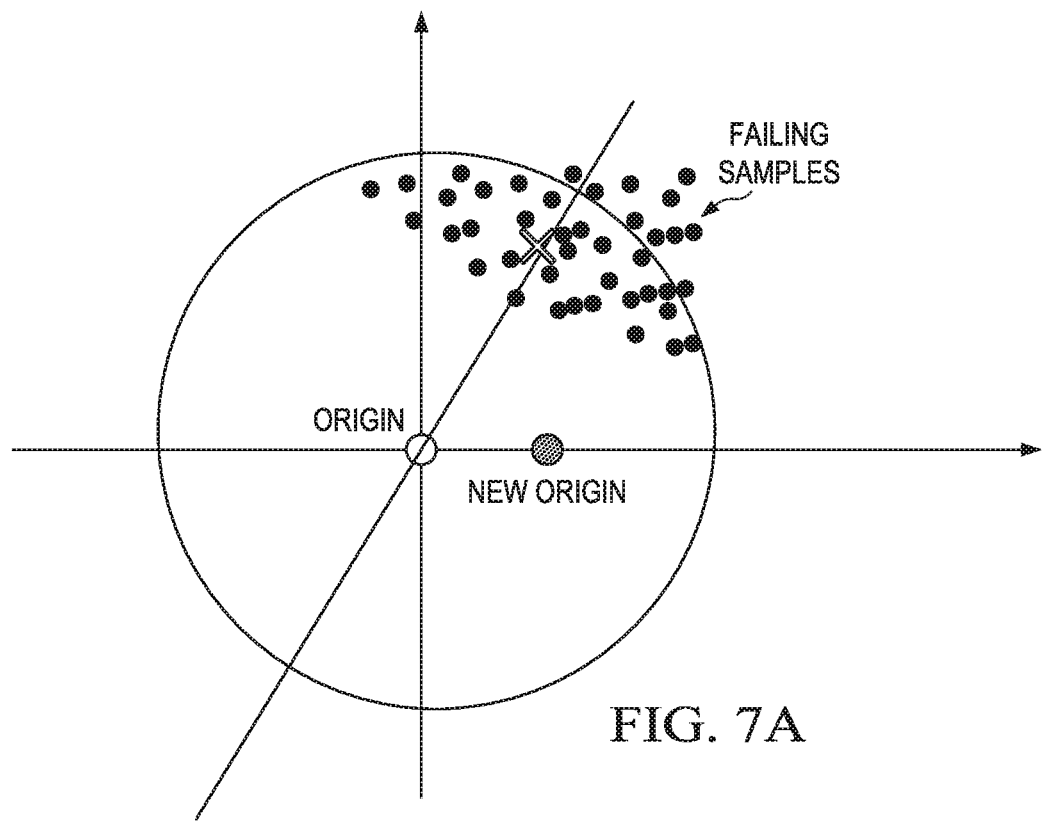
FIGS. 7A and 7B are graphs illustrating global and local variation in two dimensions in accordance with an illustrative embodiment.
Figure 7B:
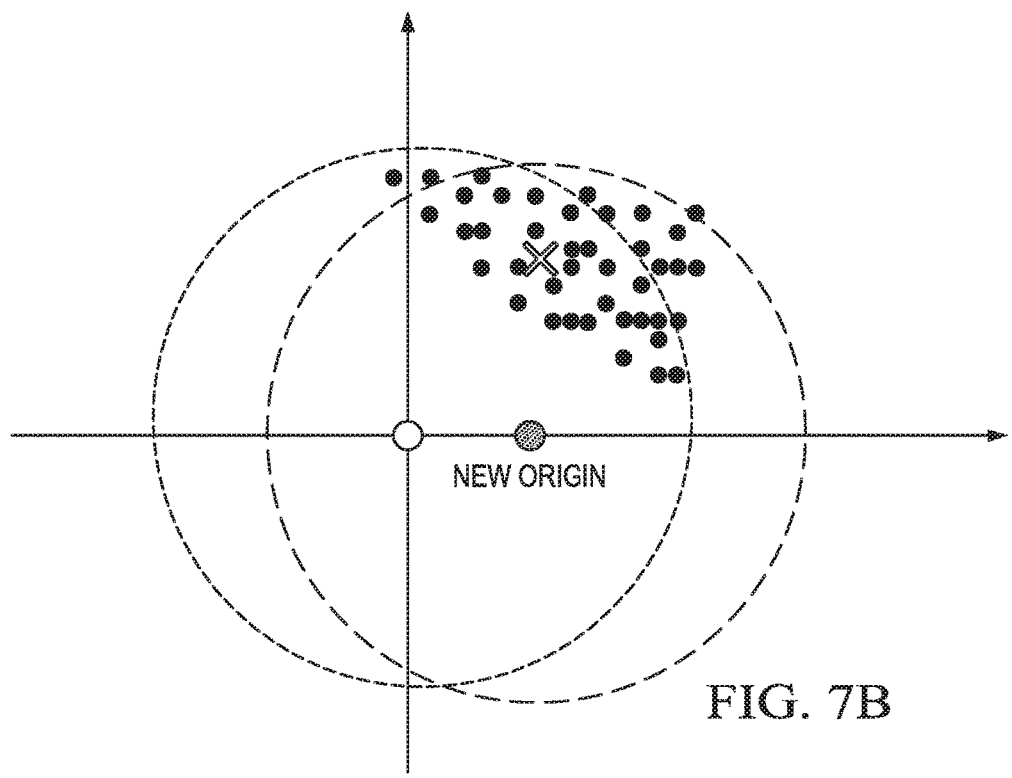

FIGS. 7A and 7B are graphs illustrating global and local variation in two dimensions in accordance with an illustrative embodiment. More particularly, FIG. 7A illustrates failure direction with respect to the origin by regular sampling. FIG. 7B illustrates the operation of using the old set of samples with respect to a new origin. As seen in FIG. 7B, simply reusing the old set of samples may result in underestimating fails.

Figure 8:
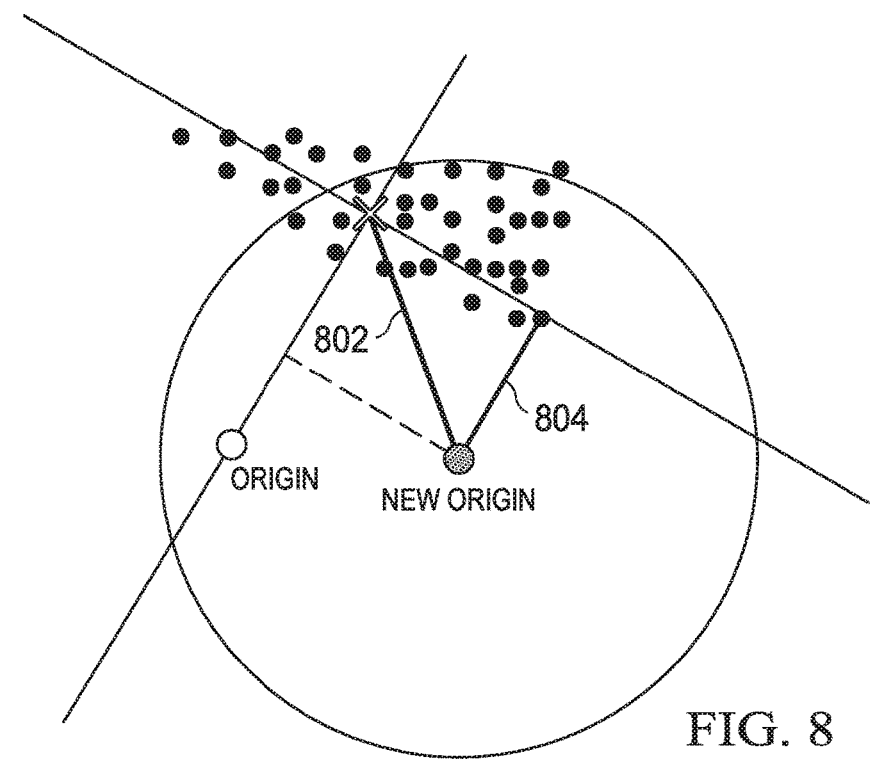
FIG. 8 illustrates how reusing the old set of samples for a new origin may underestimate fails in accordance with an illustrative embodiment.

FIG. 8 illustrates how reusing the old set of samples for a new origin may underestimate fails in accordance with an illustrative embodiment. The distance of the new origin to the failing samples (e.g., the center of gravity (COG)) can underestimate the fails, because the distance along the COG direction 802 is greater than the distance 804 of the new origin to the failing samples along the same direction of the origin to the COG.

Figure 9A:
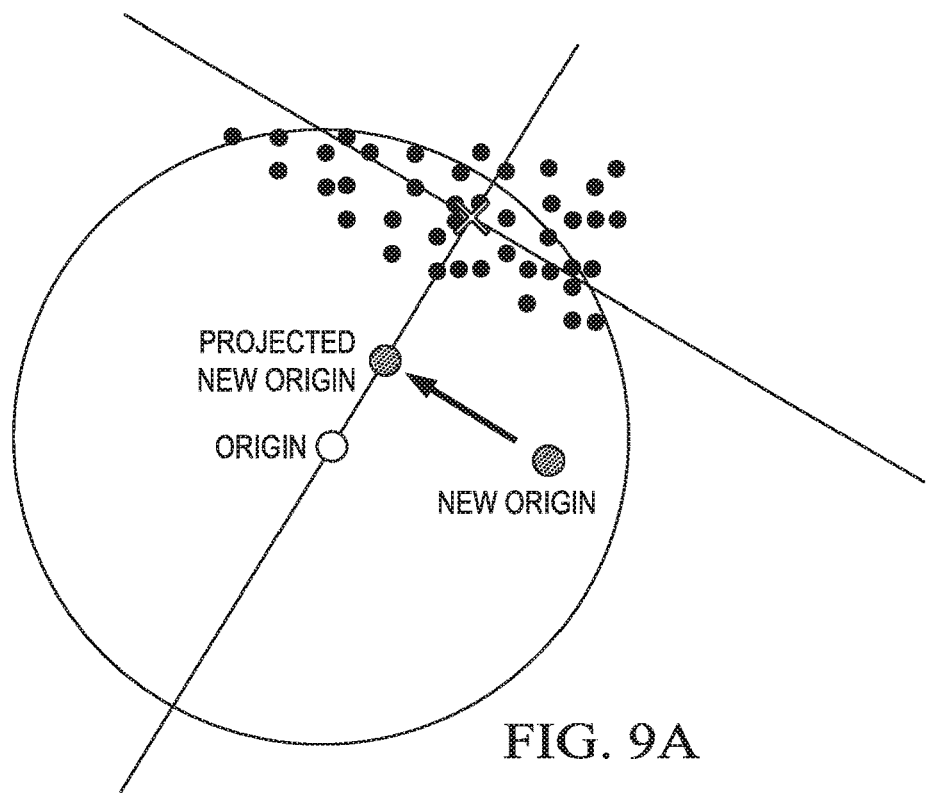
FIGS. 9A and 9B illustrate alternative approaches to determining fails for a new origin in accordance with illustrative embodiments.
Figure 9B:
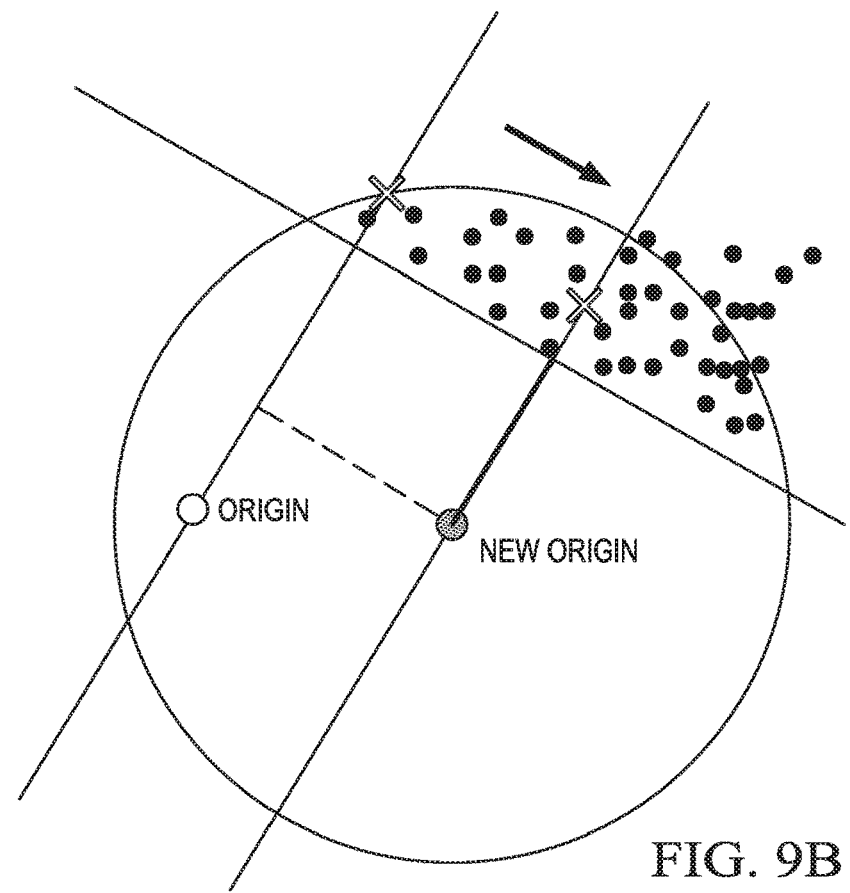

FIGS. 9A and 9B illustrate alternative approaches to determining fails for a new origin in accordance with illustrative embodiments. As shown in FIG. 9A, one approach is to project the new origin onto the line from the origin to the COG. This approach maintains failing samples close to the projected new origin. As shown in FIG. 9B, another approach is to move the population of samples, along the orthogonal direction to the line from the origin to the COG. This approach approximates the dominant fail direction in the proximity of the old origin via the COG of fails. The approach of FIG. 9B provides a fixed pattern of fails without enforcing or modeling using a fixed boundary. This approach is particularly reasonable when the new origin is not too far from the origin.

Figure 10:
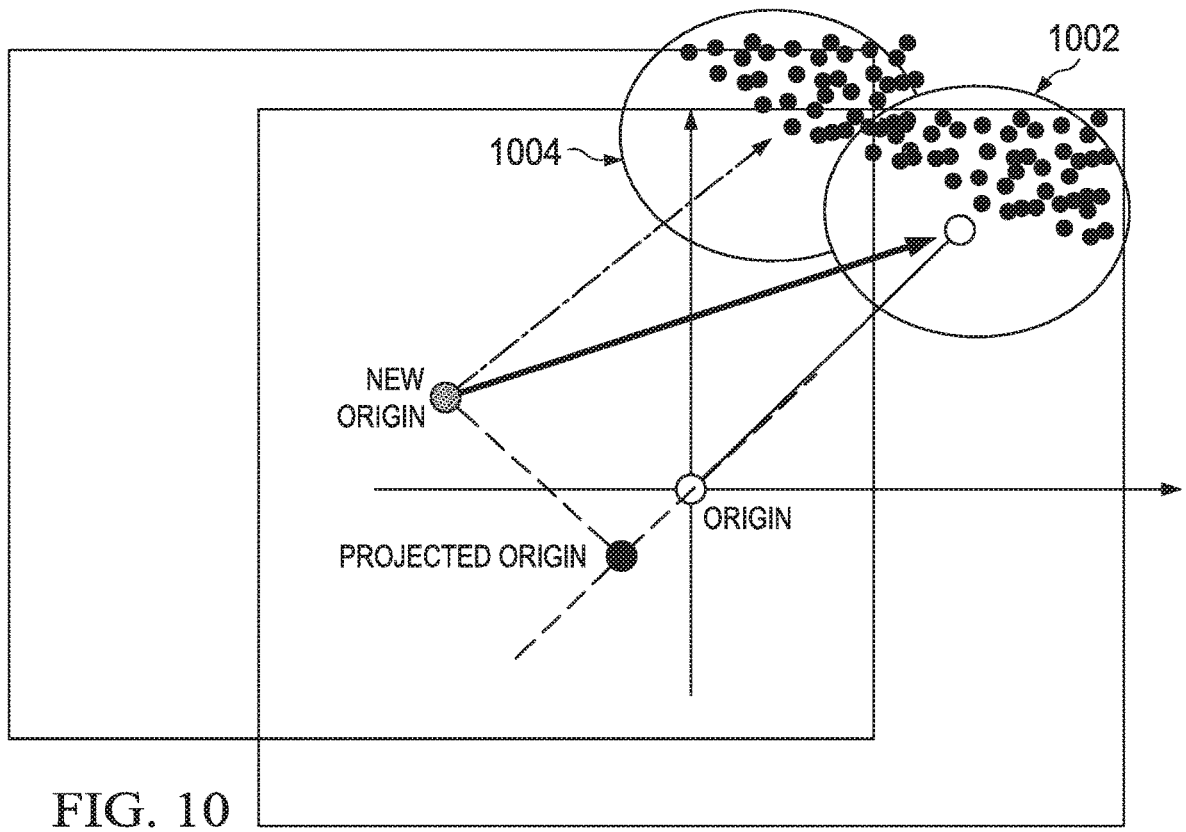
FIG. 10 illustrates an example application to importance sampling in accordance with an example embodiment.
Figure 11:
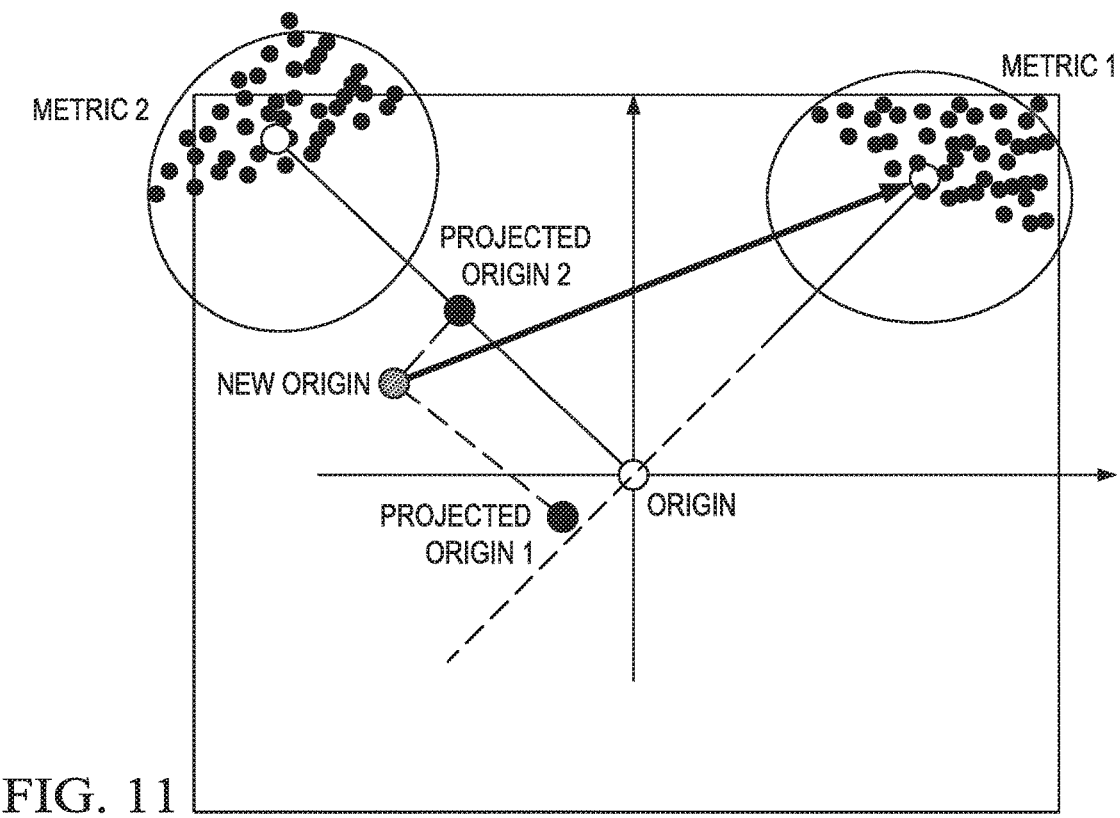
FIG. 11 illustrates an example application for importance samples for multiple metrics in accordance with an example embodiment.

FIG. 10 illustrates an example application to importance sampling in accordance with an example embodiment. In the depicted example, area 1002 shows the real importance samples with respect to the origin. Area 1004 shows the shifted importance samples with respect to the new origin. FIG. 11 illustrates an example application for importance samples for multiple metrics in accordance with an example embodiment. In the example shown in FIG. 11, each metric is identified by a dominant center of gravity of fails.

In accordance with the illustrative embodiments, the mechanism re-evaluates importance sampling with respect to the new projected origin. The importance sampling weight function of x with respect to the origin is defined as follows:

$$w(x) = \prod \exp\left(-0.5 * \left(\frac{x-0}{\sigma}\right)^2\right) \Big/ \exp\left(-0.5 * \left(\frac{x-x_{COG}}{\sigma}\right)^2\right)$$

where x is process variation variable of the device, $x_{COG}$ is the center of gravity of the one or more failing samples, and σ is the standard deviation of x. The importance sampling weight function of x with respect to the new projected origin (np) is defined as follows:

$$w(x) = \prod \exp\left(-0.5 * \left(\frac{x-x_{np}}{\sigma}\right)^2\right) \Big/ \exp\left(-0.5 * \left(\frac{x-x_{COG}}{\sigma}\right)^2\right)$$

where x is process variation variable of the device, $x_{np}$ is a new point of the projected origin for the process variation variable x, $x_{COG}$ is the center of gravity of the one or more failing samples, and σ is the standard deviation of x; the equations assume that the process variation variables are Gaussian. In case of non-gaussian variables, transformation are used to normalize the process variations via cumulative distribution functions mapping tables, or more complex weight functions can be adopted. Most importantly if the probability density function is f(x), then the shifted weights are proportional to $f(x-x_{np})/f(x-x_{cog})$. The equations above also assume that the standard deviation, σ, of the process variation variables remain the same. In case there is a change in σ associated with origin of process variation change, then the weights are modified accordingly.

$$w(x) = \prod \frac{\sigma}{\sigma_{np}} \exp\left(-0.5\left(\frac{x-x_{np}}{\sigma_{np}}\right)^2\right) \Big/ \exp\left(-0.5\left(\frac{x-x_{COG}}{\sigma}\right)^2\right)$$

where x is process variation variable of the device, $x_{np}$ is a new point of the projected origin for the process variation variable x, $x_{COG}$ is the center of gravity of the one or more failing samples, σ is the standard deviation of x, and $\sigma_{np}$ is the standard deviation associated with the new point of origin.

Figure 12:
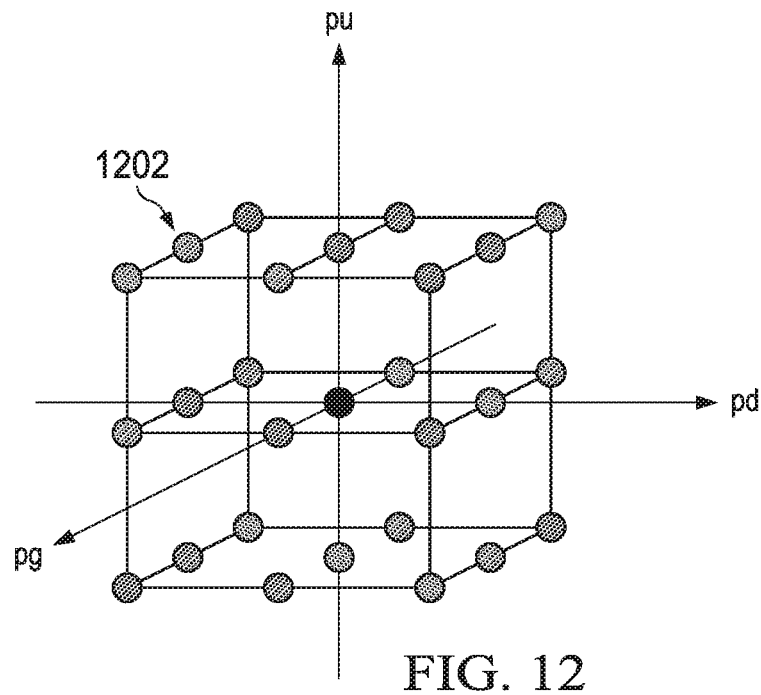
FIG. 12 is a graph illustrating importance sampling reuse for a set of process variations in accordance with an illustrative embodiment.

FIG. 12 is a graph illustrating importance sampling reuse for a set of process variations in accordance with an illustrative embodiment. In the example shown in FIG. 12, there are three variables, in this instance for a pass gate (pg), a pull-up transistor (pu), and a pull-down transistor (pd). The mechanism of the illustrative embodiments may perform MIS analysis at an origin and predict yield at different corners 1202 with no additional simulations.

Thus, the mechanism of the illustrative embodiments may be applied reuse importance sampling to determine yield given manufacturing variability. The mechanism may estimate yield at various corners. Designers currently study multiple corner combinations using conventional methods. For example, designers may maintain a table of a hundred or more $v_{dd}/v_{cc}$ points for which yield is being computed. The mechanism of the illustrative embodiments allow designers to more easily and accurately estimate yield gradients and sensitivity to manufacturing variability space and to even estimate weighted equivalent yield within the manufacturing variability space at each of these points with minimum computation/simulation effort.

Figure 13:
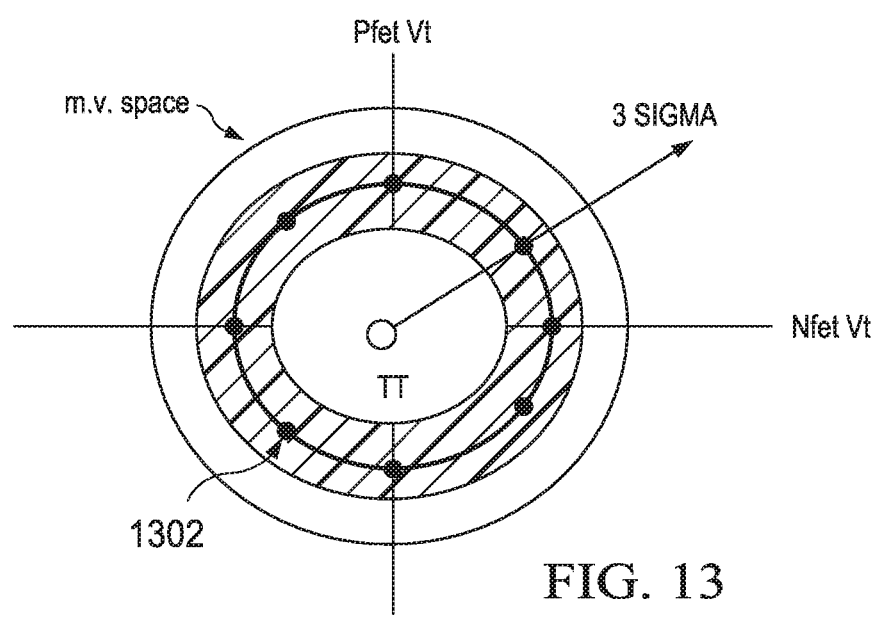
FIG. 13 illustrates an example application of importance sampling reuse for manufacturing variability in accordance with an example embodiment.

FIG. 13 illustrates an example application of importance sampling reuse for manufacturing variability in accordance with an example embodiment. The mechanism may perform importance sampling reuse for various corners 1302 within the manufacturing variability space. The standard deviation within the manufacturing variability space ($\sigma_{mv}$) may be much less than the standard deviation for random dopant fluctuation ($\sigma_{RDF}$). The small standard deviation helps in terms of better accuracy. The corners 1302 may be defined by $v_t$ changes in two-dimensional or three-dimensional space. Importance sampling may be performed in six-dimensional space.

Figure 14:
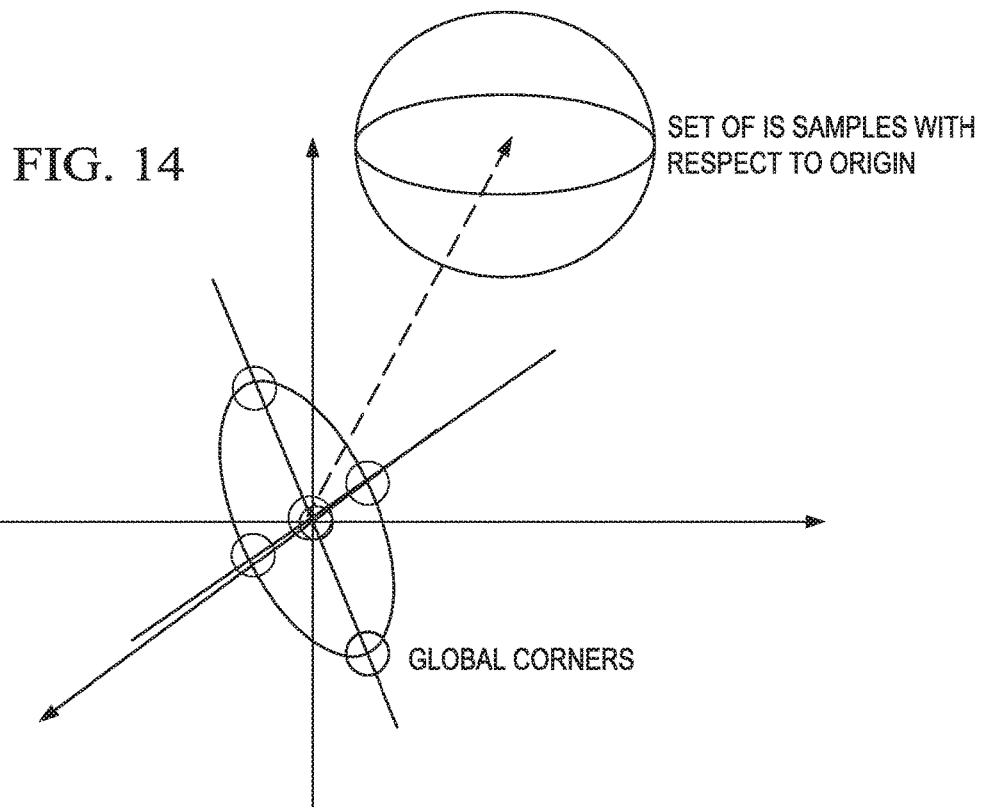
FIG. 14 is a graph illustrating the manufacturing variability space in accordance with an example embodiment.

FIG. 14 is a graph illustrating the manufacturing variability space in accordance with an example embodiment. The mechanism of the illustrative embodiment may estimate yield for each corner with no additional simulations. The mechanism may reuse samples from "nominal" corner analysis rather than one origin. The example shown in FIG. 14 assumes three-dimensional importance sampling and two-dimensional global variability space.

The mechanism of the illustrative embodiments may be applied to design centering. The mechanism may determine yield as $v_t$ centers of design are moved around. This may enable identifying optimal design centers. For instance, the mechanism of the illustrative embodiments may be part of an adaptive search scheme (or hybrid), which is good to guide gradient, to provide initial solution, etc. True sampling could be performed to certify the yield determined using the importance sampling reuse. In another example embodiment, the mechanism of the illustrative embodiments may be used to determine yield for negative biased temperature instability (NBTI) or positive biased temperature instability (PBTI).

Figure 15:
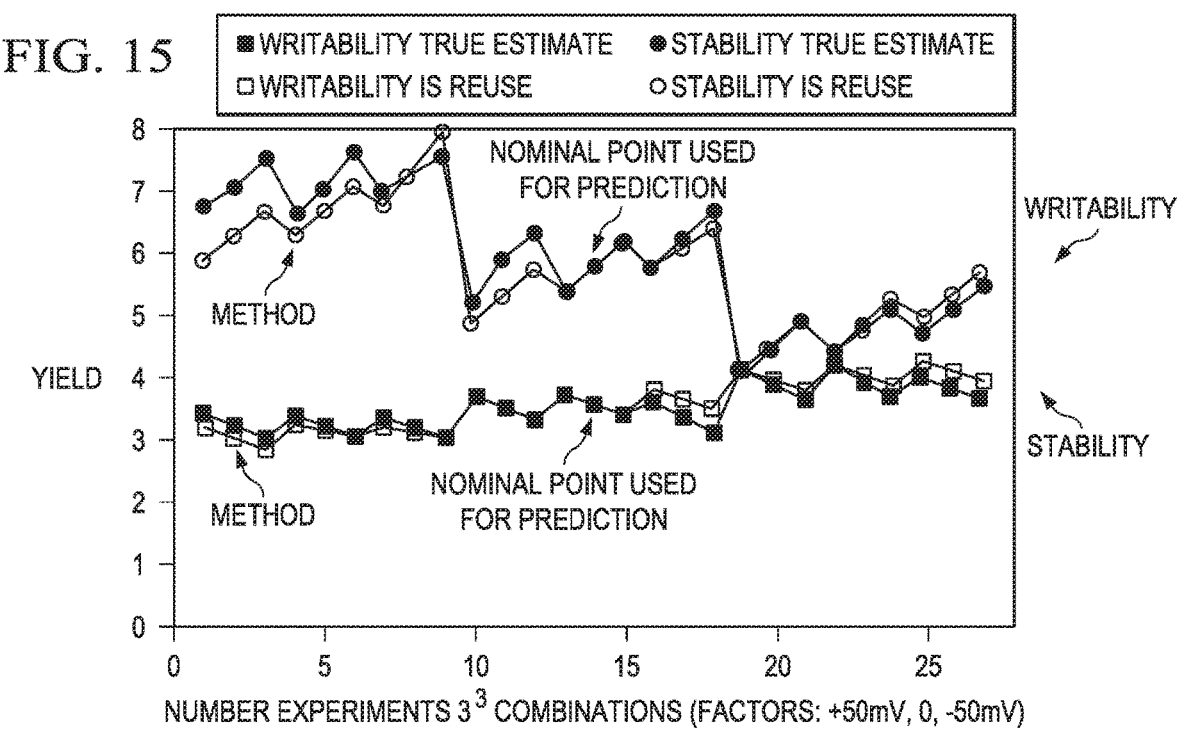
FIG. 15 is a graph illustrating results for an example static random access memory in accordance with an illustrative embodiment.

FIG. 15 is a graph illustrating results for an example static random access memory in accordance with an illustrative embodiment. As can be seen, the writability and stability for importance sampling reuse are a good approximation for the true estimate. The estimated bounds are large enough for manufacturing variability.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

FIG. 16 is a flowchart illustrating operation of a mechanism for statistical design with importance sampling reuse in accordance with an illustrative embodiment. Operation begins, and the mechanism performs uniform sampling (block 1602). The mechanism finds a center of gravity (COG) for each metric (block 1604). Then, the mechanism finds importance samples (block 1606). For each new origin, the mechanism finds a suitable projection (bock 1608) and recomputes new importance sampling ratios (block 1610). Thereafter, operation ends.

In an alternative embodiment, in block 1610, the mechanism may project a new center of gravity with respect to the new origin. In another embodiment, the mechanism may perform a second stage of importance sampling given the same uniform sampling from block 1602.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The illustrative embodiments may be utilized in many different types of data processing environments including a distributed data processing environment, a single data processing device, or the like. In order to provide a context for the description of the specific elements and functionality of the illustrative embodiments, FIG. 17 is provided hereafter as an example environment in which aspects of the illustrative embodiments may be implemented. While the description of FIG. 17 will focus primarily on a single data processing device implementation, this is only an example and is not intended to state or imply any limitation with regard to the features of the present invention. To the contrary, the illustrative embodiments are intended to include distributed data processing environments and embodiments.

FIG. 17 is a block diagram of an example data processing system in which aspects of the illustrative embodiments may be implemented. Data processing system 1700 is an example of a computer in which computer usable code or instructions implementing the processes for illustrative embodiments of the present invention may be located.

In the depicted example, data processing system 1700 employs a hub architecture including north bridge and memory controller hub (NB/MCH) 1702 and south bridge and input/output (I/O) controller hub (SB/ICH) 1704. Processing unit 1706, main memory 1708, and graphics processor 1710 are connected to NB/MCH 1702. Graphics processor 1710 may be connected to NB/MCH 1702 through an accelerated graphics port (AGP).

In the depicted example, local area network (LAN) adapter 1712 connects to SB/ICH 1704. Audio adapter 1716, keyboard and mouse adapter 1720, modem 1722, read only memory (ROM) 1724, hard disk drive (HDD) 1726, CD-ROM drive 1730, universal serial bus (USB) ports and other communication ports 1732, and PCI/PCIe devices 1734 connect to SB/ICH 1704 through bus 1738 and bus 1740. PCI/PCIe devices may include, for example, Ethernet adapters, add-in cards, and PC cards for notebook computers. PCI uses a card bus controller, while PCIe does not. ROM 1724 may be, for example, a flash basic input/output system (BIOS).

HDD 1726 and CD-ROM drive 1730 connect to SB/ICH 1704 through bus 1740. HDD 1726 and CD-ROM drive 1730 may use, for example, an integrated drive electronics (IDE) or serial advanced technology attachment (SATA) interface. Super I/O (SIO) device 1736 may be connected to SB/ICH 1704.

An operating system runs on processing unit 1706. The operating system coordinates and provides control of various components within the data processing system 1700 in FIG. 17. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 1700 (Java is a trademark of Sun Microsystems, Inc. in the United States, other countries, or both).

As a server, data processing system 1700 may be, for example, an IBM® eServer™ System P® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 1700 may be a symmetric multiprocessor (SMP) system including a plurality of processors in processing unit 1706. Alternatively, a single processor system may be employed.

Instructions for the operating system, the object-oriented programming system, and applications or programs are located on storage devices, such as HDD 1726, and may be loaded into main memory 1708 for execution by processing unit 1706. The processes for illustrative embodiments of the present invention may be performed by processing unit 1706 using computer usable program code, which may be located in a memory such as, for example, main memory 1708, ROM 1724, or in one or more peripheral devices 1726 and 1730, for example.

A bus system, such as bus 1738 or bus 1740 as shown in FIG. 17, may be comprised of one or more buses. Of course, the bus system may be implemented using any type of communication fabric or architecture that provides for a transfer of data between different components or devices attached to the fabric or architecture. A communication unit, such as modem 1722 or network adapter 1712 of FIG. 17, may include one or more devices used to transmit and receive data. A memory may be, for example, main memory 1708, ROM 1724, or a cache such as found in NB/MCH 1702 in FIG. 17.

Those of ordinary skill in the art will appreciate that the hardware in FIG. 17 may vary depending on the implementation. Other internal hardware or peripheral devices, such as flash memory, equivalent non-volatile memory, or optical disk drives and the like, may be used in addition to or in place of the hardware depicted in FIG. 17. Also, the processes of the illustrative embodiments may be applied to a multiprocessor data processing system, other than the SMP system mentioned previously, without departing from the spirit and scope of the present invention.

Moreover, the data processing system 1700 may take the form of any of a number of different data processing systems including client computing devices, server computing devices, a tablet computer, laptop computer, telephone or other communication device, a personal digital assistant (PDA), or the like. In some illustrative examples, data processing system 1700 may be a portable computing device which is configured with flash memory to provide non-volatile memory for storing operating system files and/or user-generated data, for example. Essentially, data processing system 1700 may be any known or later developed data processing system without architectural limitation.

Thus, the illustrative embodiments provide a mechanism for reusing importance sampling for efficient cell failure rate estimation of process variations and other design considerations. First, the mechanism performs a search across circuit parameters to determine failures with respect to a set of performance variables. For a single failure region, the initial search may be a uniform sampling of the parameter space. Mixture importance sampling (MIS) efficiently may estimate the single failure region. The mechanism then finds a center of gravity for each metric and finds importance samples. Then, for each new origin corresponding to a process variation or other design consideration, the mechanism finds a suitable projection and recomputes new importance sampling (IS) ratios.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising at least one processor and at least one memory, the method comprising:
configuring the at least one memory with instructions, which are executed by the at least one processor and configure the at least one processor to implement an apparatus for determining failure rate of a memory circuit device using importance sampling reuse;
performing a plurality of simulations of the memory circuit device over a random sample space for a performance metric for the memory circuit device with respect to an origin until a predetermined number of failing samples are encountered to form a uniform distribution set of simulation samples, wherein the origin represents nominal values for one or more device parameters, corresponding to one or more process variation variables, for a given design of the memory circuit device, wherein the performance metric is an operational performance value of the memory circuit device, and wherein the uniform distribution set of simulation samples comprises a plurality of failing samples;
generating a first set of samples for determining a first yield of the memory circuit device at least by applying an importance sampling weight function with respect to the origin and the one or more device parameters, based on the plurality of failing samples;
generating a second set of samples for determining a second yield of the memory circuit device at least by applying a new importance sampling weight function to the one or more device parameters of the given design of the memory circuit device with respect to a new origin that is a projection of the origin based on the plurality of failing samples, wherein the new origin represents one or more alternative values, different from one or more of the nominal values, for the one or more device parameters of the given design of the memory circuit device;
determining a failure rate for the memory circuit device using the second set of importance samples corresponding to alternative values for the device parameters; and
determining a modification to the given design of the memory circuit device based on the alternative values for the one or more device parameters to generate a modified design of the memory circuit device.

2. The method of claim 1, wherein applying the new importance sampling weight function for the new origin comprises:
determining a line passing through the origin and a center of gravity of the plurality of failing samples within the uniform distribution set of simulation samples;
projecting the new origin onto the line passing through the origin and the center of gravity of the plurality of failing samples to determine a projected origin; and
determining the new importance sampling weight function with respect to the projected origin.

3. The method of claim 1, wherein applying the new importance sampling weight function for the new origin comprises:
determining a line passing through the origin and a center of gravity of plurality of failing samples within the uniform distribution set of simulation samples;
moving the uniform distribution set of simulation samples in a direction orthogonal to the line passing through the origin and the center of gravity of the plurality of failing samples to determine a set of projected samples with respect to the new origin; and
determining the new importance sampling weight function based on the set of projected samples.

4. The method of claim 1, wherein applying the new importance sampling weight function for the new origin comprises:
determining the new importance sampling weight function based on a center of gravity of the plurality of failing samples within the uniform distribution set of simulation samples and based on the new origin.

5. The method of claim 1, wherein the new importance sampling weight function is as follows:

$$w(x) = \prod \exp\left(-0.5 * \left(\frac{x - x_{np}}{\sigma}\right)^2\right) \Big/ \exp\left(-0.5 * \left(\frac{x - x_{COG}}{\sigma}\right)^2\right)$$

where x is a process variation variable of the memory circuit device corresponding to the one or more device parameters, $x_{np}$ is the process variation variable x for the new origin, $x_{COG}$ is the center of gravity of the plurality of failing samples, and σ is the standard deviation of x.

6. The method of claim 1, wherein the new importance sampling weight function is as follows:

$$w(x) = \prod \frac{\sigma}{\sigma_{np}} \exp\left(-0.5 * \left(\frac{x - x_{np}}{\sigma_{np}}\right)^2\right) \Big/ \exp\left(-0.5 * \left(\frac{x - x_{COG}}{\sigma}\right)^2\right)$$

where x is process variation variable of the memory circuit device corresponding to the one or more device parameters, $x_{np}$ is the process variation variable x for the new origin, $x_{COG}$ is the center of gravity of the plurality of failing samples, σ is the standard deviation of x, and $\sigma_{np}$ is the standard deviation associated with the new origin.

7. The method of claim 1, wherein the simulation samples in the uniform distribution have associated vectors of design and process dependent electric circuit parameters that determine the performance of the memory circuit device, wherein samples in the first set of samples have corresponding vectors of design and process dependent electric circuit parameters, samples in the second set of samples have corresponding vectors of design and process dependent electric circuit parameters, and determining a modification to the given design of the memory circuit device based on the alternative values for the one or more device parameters to generate a modified design of the memory circuit device is performed based on the vectors of design and process dependent electric circuit parameters corresponding to the samples in the second set of samples.

8. The method of claim 1, wherein determining a modification to the given design of the memory circuit device further comprises estimating a yield gradient for the memory circuit device based on the first set of samples and the second set of samples.

9. The method of claim 1, wherein determining a modification to the given design of the memory circuit device comprises modifying one or more design parameters of the given design based on the second set of samples in response to the second yield being an improvement over the first yield.

10. The method of claim 1, further comprising:
repeating the generation of the second set of samples at least by applying the new importance sampling weight function to generate new sets of samples from the uniform distribution set of simulation samples for a plurality of new origins to identify a new origin in the plurality of new origins that provides an improved yield over a yield corresponding to the origin.

11. A computer program product comprising a non-transitory computer readable storage medium being configured with a computer readable program stored therein, wherein the computer readable program, when executed on at least one processor of a computing device, causes the at least one processor to implement an apparatus for determining failure rate of a device using importance sampling reuse, wherein the computer readable program causes the computing device to:
perform a plurality of simulations of the memory circuit device over a random sample space for a performance metric for the memory circuit device with respect to an origin until a predetermined number of failing samples are encountered to form a uniform distribution set of simulation samples, wherein the origin represents nominal values for one or more device parameters, corresponding to one or more process variation variables, for a given design of the memory circuit device, wherein the performance metric is an operational performance value of the memory circuit device, and wherein the uniform distribution set of simulation samples comprises a plurality of failing samples;
generate a first set of samples for determining a first yield of the memory circuit device at least by applying an importance sampling weight function with respect to the origin and the one or more device parameters, based on the plurality of failing;
generate a second set of samples for determining a second yield of the memory circuit device at least by applying a new importance sampling weight function to the one or more device parameters of the given design of the memory circuit device with respect to a new origin that is a projection of the origin based on the plurality of failing samples, wherein the new origin represents one or more alternative values, different from one or more of the nominal values, for the one or more device parameters of the given design of the memory circuit device;
determine a failure rate for the memory circuit device using the second set of importance samples corresponding to alternative values for the device parameters; and
determine a modification to the given design of the memory circuit device based on the alternative values for the one or more device parameters to generate a modified design of the memory circuit device.

12. The computer program product of claim 11, wherein applying the new importance sampling weight function for the new origin comprises:
determining a line passing through the origin and a center of gravity of the plurality of failing samples within the uniform distribution set of simulation samples;
projecting the new origin onto the line passing through the origin and the center of gravity of the plurality of failing samples to determine a projected origin; and
determining the new importance sampling weight function with respect to the projected origin.

13. The computer program product of claim 11, wherein applying the new importance sampling weight function for the new origin comprises:
determining a line passing through the origin and a center of gravity of plurality of failing samples within the uniform distribution set of simulation samples;
moving the uniform distribution set of samples in a direction orthogonal to the line passing through the origin and the center of gravity of the plurality of failing samples to determine a set of projected samples with respect to the new origin; and
determining the new importance sampling weight function based on the set of projected samples.

14. The computer program product of claim 11, wherein applying the new importance sampling weight function for the new origin comprises:
determining the new importance sampling weight function based on a center of gravity of the plurality of failing samples within the uniform distribution set of simulation samples and based on the new origin.

15. The computer program product of claim 11, wherein the new importance sampling weight function is as follows:

$$w(x) = \prod \exp\left(-0.5 * \left(\frac{x - x_{np}}{\sigma}\right)^2\right) \bigg/ \exp\left(-0.5 * \left(\frac{x - x_{COG}}{\sigma}\right)^2\right)$$

where x is process variation variable of the memory circuit device corresponding to the one or more device parameters, $x_{np}$ is the process variation variable x for the new origin, $x_{COG}$ is the center of gravity of the plurality of failing samples, and $\sigma$ is the standard deviation of x.

16. An apparatus, comprising:
at least one processor; and
at least one memory coupled to the at least one processor, wherein the at least one memory comprises instructions which, when executed by the at least one processor, cause the at least one processor to implement an apparatus for determining failure rate of a device using importance sampling reuse, wherein the instructions cause the at least one processor to:
perform a plurality of simulations of the memory circuit device over a random sample space for a performance metric for the memory circuit device with respect to an origin until a predetermined number of failing samples are encountered to form a uniform distribution set of simulation samples, wherein the origin represents nominal values for one or more device parameters, corresponding to one or more process variation variables, for a given design of the memory circuit device, wherein the performance metric is an operational performance value of the memory circuit device, and wherein the uniform distribution set of simulation samples comprises a plurality of failing samples;
generate a first set of samples for determining a first yield of the memory circuit device at least by applying an importance sampling weight function with respect to the origin and the one or more device parameters, based on the plurality of failing samples;
generate a second set of samples for determining a second yield of the memory circuit device at least by applying a new importance sampling weight function to the one or more device parameters of the given design of the memory circuit device with respect to a new origin that is a projection of the origin based on the plurality of failing samples, wherein the new origin represents one or more alternative values, different from one or more of the nominal values, for the one or more device parameters of the given design of the memory circuit device;
determine a failure rate for the memory circuit device using the second set of importance samples corresponding to alternative values for the device parameters; and
determine a modification to the given design of the memory circuit device based on the alternative values for the one or more device parameters to generate a modified design of the memory circuit device.

17. The apparatus of claim 16, wherein applying the new importance sampling weight function for the new origin comprises:
determining a line passing through the origin and a center of gravity of the plurality of failing samples within the uniform distribution set of simulation samples;
projecting the new origin onto the line passing through the origin and the center of gravity of the plurality of failing samples to determine a projected origin; and
determining the new importance sampling weight function with respect to the projected origin.

18. The apparatus of claim 16, wherein applying the new importance sampling weight function for the new origin comprises:
determining a line passing through the origin and a center of gravity of the plurality of failing samples within the uniform distribution set of simulation samples;
moving the uniform distribution set of samples in a direction orthogonal to the line passing through the origin and the center of gravity of the plurality of failing samples to determine a set of projected samples with respect to the new origin; and
determining the new importance sampling weight function based on the set of projected samples.

19. The apparatus of claim 16, wherein applying the new importance sampling weight function for the new origin comprises:
determining the new importance sampling weight function based on a center of gravity of the plurality of failing samples in the uniform distribution set of simulation samples and based on the new origin.

20. The apparatus of claim 16, wherein the new importance sampling weight function is as follows:

$$w(x) = \prod \exp\left(-0.5 * \left(\frac{x - x_{np}}{\sigma}\right)^2\right) \bigg/ \exp\left(-0.5 * \left(\frac{x - x_{COG}}{\sigma}\right)^2\right)$$

where x is process variation variable of the memory circuit device corresponding to the one or more device parameters, $x_{np}$ is the process variation variable x for the new origin, $x_{COG}$ is the center of gravity of the plurality of failing samples, and $\sigma$ is the standard deviation of x.

* * * * *